United States Patent
Dorokhin et al.

(10) Patent No.: US 11,536,448 B2
(45) Date of Patent: Dec. 27, 2022

(54) STEAM-GENERATING UNIT OF DUAL CIRCUIT REACTOR WITH PURGE AND DRAIN SYSTEM

(71) Applicant: JOINT STOCK COMPANY "ATOMENERGOPROEKT", Moscow (RU)

(72) Inventors: Konstantin Vladimirovich Dorokhin, Balashikha (RU); Andrei Viktorovich Shestakov, Moscow (RU)

(73) Assignee: JOINT STOCK COMPANY "ATOMENERGOPROEKT", Moscow (RU)

( * ) Notice: Subject to any disclaimer, the term of this patent is extended or adjusted under 35 U.S.C. 154(b) by 173 days.

(21) Appl. No.: 16/627,747

(22) PCT Filed: Dec. 29, 2017

(86) PCT No.: PCT/RU2017/001010
§ 371 (c)(1),
(2) Date: Dec. 30, 2019

(87) PCT Pub. No.: WO2019/132704
PCT Pub. Date: Jul. 4, 2019

(65) Prior Publication Data
US 2021/0156559 A1   May 27, 2021

(51) Int. Cl.
*F22B 37/52* (2006.01)
*F22B 35/00* (2006.01)
(Continued)

(52) U.S. Cl.
CPC ........... *F22B 37/52* (2013.01); *F22B 35/004* (2013.01); *F22B 37/483* (2013.01); *F28G 9/00* (2013.01); *G21C 19/28* (2013.01); *G21D 1/006* (2013.01)

(58) Field of Classification Search
CPC ............................. F22B 37/52; F22B 37/483
See application file for complete search history.

(56) References Cited

U.S. PATENT DOCUMENTS

| 3,130,713 | A | * | 4/1964 | Sprague | .................... F22D 1/16 122/32 |
| 4,406,794 | A | * | 9/1983 | Brigante | ................. B03C 1/023 210/695 |

(Continued)

*Primary Examiner* — Nathaniel Herzfeld
(74) *Attorney, Agent, or Firm* — J. Miguel Hernandez; James R. Gourley; Carstens, Allen & Gourley, LLP

(57) ABSTRACT

The steam generating unit of dual circuit reactor with blowdown and drain system is implemented in the close loop, without any conventional blowdown expansion tanks and is designed for maximum pressure of the steam generator (SG) working medium. The SG blowdown water is combined into a single line, cooled down in the regenerative heat exchanger, then in the blowdown aftercooler and drain cooling line and taken out of the tight shell. Out of the tight shell, the SG blowdown water is supplied for treatment to the SG blowdown water treatment system designed for maximum pressure of the steam generator (SG) working medium. After treatment, the water returns to the tight shell and, via the regenerative heat exchanger, to the feed pipelines of each SG. The invention provides increased SG blowdown that leads to the accelerated chemical condition normalization even with considerable deviations.

3 Claims, 1 Drawing Sheet

(51) Int. Cl.
  *F22B 37/48* (2006.01)
  *F28G 9/00* (2006.01)
  *G21C 19/28* (2006.01)
  *G21D 1/00* (2006.01)

(56) References Cited

U.S. PATENT DOCUMENTS

| | | | | |
|---|---|---|---|---|
| 4,649,019 A * | 3/1987 | Jawor | ............... | F22B 37/50 |
| | | | | 165/138 |
| 5,790,619 A * | 8/1998 | Peck | ............... | G21C 19/28 |
| | | | | 376/399 |
| 2017/0321880 A1* | 11/2017 | Lakhov | ............... | G21D 5/12 |
| 2017/0336066 A1* | 11/2017 | Lakhov | ............... | F22B 1/02 |

* cited by examiner

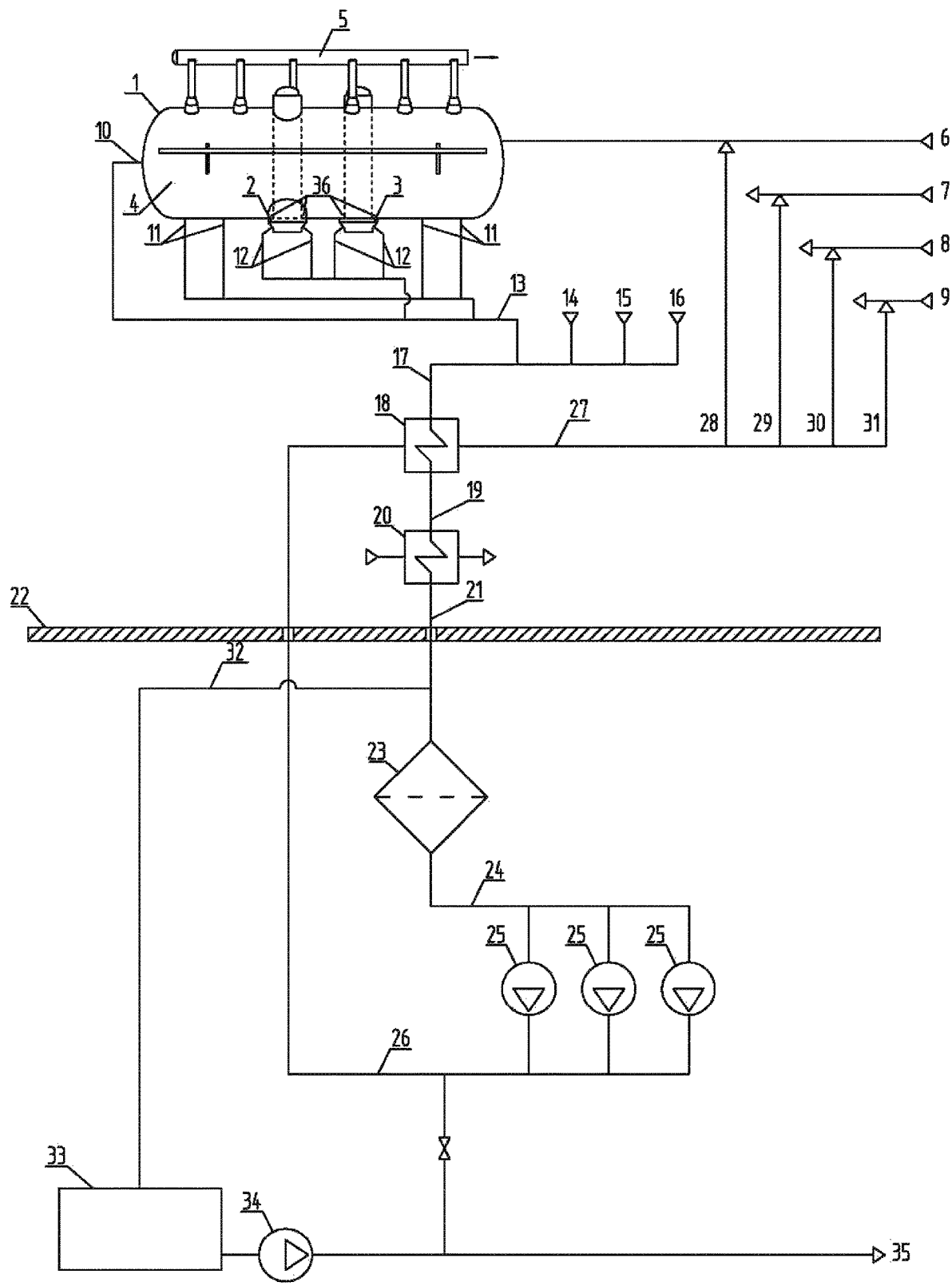

STEAM-GENERATING UNIT OF DUAL CIRCUIT REACTOR WITH PURGE AND DRAIN SYSTEM

CROSS-REFERENCE TO RELATED APPLICATIONS

This application is a US 371 application from PCT/RU2017/001010 filed Dec. 29, 2017, the technical disclosure of which is hereby incorporated herein by reference.

FIELD OF THE INVENTION

The invention refers to the power engineering and can be used in dual circuit reactors of the nuclear power units at the nuclear power plants with water-water energetic reactor, pressurized water and steam-generating unit with horizontal steam generators.

BACKGROUND OF THE INVENTION

For the purposes of description of this invention, the used terms have the following meanings:
"hot" header—the steam generator header comprising the coolant from the first reactor circuit
"cold" header—the header through which the primary circuit coolant leaves the steam generator and enters the suction line of the main circulating pump;
header "pockets"—the dead zones formed between the primary circuit headers and internal surface of the steam generator bottom and impairing the purge quality;
"hot" bottom—steam generator bottom from the "hot" header side;
"cold" bottom—steam generator bottom from the "cold" header side;
"salt" compartment—the area in the steam generator with the highest dissolved salts concentration in the boiler water from the "cold" bottom side;
active water treatment—a system of filters designated for purge water treatment from the corrosion products and impurities in ion form.

At the nuclear power plants (NPP) with double loop VVER reactors (pressurized water reactors, PWR), to ensure successful functioning of the reactor compartment it requires a variety of process systems, one of which, and both of the primary and secondary circuits, is a steam generator that, on the one hand generates the vapour used as working body of the steam turbine for electricity generation that is due to the heat produced in the reactor, and on the other hand, it is intended reliably and continuously ensure the reactor core cooling. When the steam generating unit is in operation, the primary circuit coolant is pumped through its steam generators that sets forth specific requirements to its design and operation. In particular, the steam generating unit is enclosed into the containment dome, wherein to ensure tightness, a number of ducts in the containment intended for process lines must be minimized.

The NPP reliability, particularly, depends on the organization of the secondary circuit water chemistry (WC). The WC disturbances can lead to premature failure of the steam generators being the major parts of the steam generating unit, i.e can significant decrease its operational reliability and life time. To ensure reliable and safe operation of the steam generator, it is necessary timely to remove from the heat exchange surface of the pipes and out of the steam generator the deposits where the corrosive impurities of the boiler water are concentrated. The high concentration of these impurities in particular steam generator zones can lead to the corrosion cracking of the weld joints and heat exchange parts of the steam generator. The undesired impurities are removed out of the steam generator by blowdown that is performed both continuously and regularly as well as combining the continuous and regular blowdown.

There is the known steam generating unit with the reactor VVER-1000 comprising four identical steam generators that represent the horizontal single-casing dual circuit heat exchangers with the immersed heat exchange surface. The steam generator consists of a casing made in the form of horizontal drum connected with the horizontal steam header and feed water header, the steam generator includes the inlet ("hot") and outlet ("cold") vertical pipe headers of the primary coolant and blowdown connection. To maintain normal salt mode, the steam generator is provided with continuous and periodic blowdowns/I. N. Nignatulin, B. I. Nignatulin. Nuclear Power Plants. Workbook for Institutes, M., Energoatomizdat, 1986. P. 120-122/There is the known steam generating unit of the dual circuit reactor with the blowdown and drain system, comprising four steam generators enclosed into the tight volume of the reactor, with horizontal casing with lower casing component, "hot" and "cold" headers of the primary coolant with the pockets created between them and bottom surface of the steam generator, salt compartments, steam header and blowdown and drain system. The coolant from the primary circuit enters the "hot" header. It releases its heat to the steam generator water and, cooled down, enters, through the "cold" header, the suction line of the main circulating pump. The feed water is supplied to the steam generator. The dried steam leaves the steam header, and then it is supplied to the turbine through the steampipes. The blowdown system of the steam generators consists of two blowdown lines being individual for each steam generator and intended for independent continuous and regular blowdowns, wherein the impact of blowdown of individual steam generators on each other is excluded. The extraction for continuous blowdown is made from the salt compartment, and for the regular—from the pockets of the "hot" and "cold" headers and blowdown lines from the lower casing component. The headers of continuous and regular blowdown of each steam generator are made separate and taken out of the tight volume until included into the connection pipeline of the blowdown expansion tanks. Each steam generator is also provided with individual drain tube connected to the drain pipeline, and then the drain pipelines of the steam generators are combined in one drain header, taken out of the tight volume and directed to the drain coolant B. I. Lukasevich, N. B. Trunov, et al. Steam Generators of VVER Reactor Units for Nuclear Power Plants, M: ICC Akademkniga, 2004, PP. 83-86/.

The disadvantages of the known steam generating unit are the required availability of blowdown expansion tank to decrease the pressure to the deaerator parameters, and the energy loss to volume return to the expansion tank, to the secondary circuit, increases, insignificant consumption of the blowdown water that increases the WC normalization time, separate taking the continuous and regular blowdown header and drain header out of the tight volume that reduces the operational reliability due to the additional reduction of tightness, as well as the necessity of process communication with the engine hall and system operation independently from the engine hall equipment, because the steam release from the expansion tank is made into the steam header of the deaerator, and the treated blowdown water is returned to the deaerator or expansion tank of the engine hall drains.

There is also the known blowdown and drain steam generator system designed for maintaining the chemical condition and draining them (http://www.stroitelstvo-new.ru/nasosy/paroturbinnaya-ustanovka.shtml).

The system operates in continuous blowdown mode and in the mode of combination of continuous and regular blowdowns, wherein the sludge and suspended matters are removed from the generator.

The blowdown water from the steam generator enters the blowdown expansion tank, and then is pumped via the regenerative blowdown heat exchanger, additional coolant and treatment system to the turbine unit low pressure heaters. In the draining mode, the water from the steam generators flows downstream the drain pipelines to the drain tank, and then is pumped for treatment as the tank level increases.

The disadvantages of the known technical solution are the required pressure decrease to the deaerator parameters using the blowdown expansion tank and, as a consequence, the increased energy losses for the blowdown water return to the secondary circuit, process communication with the engine hall and dependence of the system operation on the engine hall equipment as the evaporation is released from the blowdown expansion tank to the steam header of the deaerator, the treated blowdown water is returned to the deaerator or drain expansion tank of the engine hall, as well as insufficient consumption of the blowdown water, thus increasing the WC normalization time.

SUMMARY OF THE INVENTION

The technical problem to be solved by the applied invention consists in creating the steam generating unit of dual circuit reactor with high performance reliability and life cycle.

The technical result is in reduction of the secondary circuit WC normalization time due to the increased consumption of the blowdown water with simultaneous reduction of energy losses to return of the treated blowdown water to the secondary circuit and ensuring the self-sustained operation of the steam generating unit.

The technical problem is solved, and the technical result is achieved due to that the steam generating unit of dual circuit reactor with blowdown and drain system comprises four identical steam generators enclosed into the protection tight volume, with horizontal casing with lower casing component, hot and cold headers of the primary coolant with the pockets and salt compartment; each steam generator is connected to the steam header, feed water supply pipeline, blowdown lines from the salt compartment, from the lower casing component and pockets of the primary circuit headers, wherein all the blowdown lines of each steam generator are combined into a single blowdown header of the steam generator with further combination into the common blowdown header of the steam generators that is connected to the regenerative heat exchanger inlet, with the discharge line connected to the blowdown aftercooler and the drain cooling line is connected to the discharge line of the blowdown aftercooled water that is taken out of the protective tight volume and connected to the active water treatment system with the discharge line of the treated blowdown water of the steam generators and mounted thereon by means of, at least, one treated blowdown water pump which pressure line is made in the protective tight volume and connected to the regenerative heat exchanger intertubular space inlet, with the outlet connected to the feed water supply pipelines of the relevant steam generator via the common pipeline for the treated blowdown water supply and pipelines for treated blowdown water supply of each steam generator, wherein the blowdown aftercooled water pipeline, after taken out of the protective tight volume, is provided with the steam generator drain and discharge pipeline connected to the water drain tank.

It is preferable that the blowdown water discharge pipeline of the steam generators was provided with three pumps—operating, reserve and repair.

BRIEF DESCRIPTION OF THE DRAWINGS

The invention is described by a simplified scheme of the steam generating unit of dual circuit reactor with blowdown and drain system.

The steam generating unit of dual circuit reactor with blowdown and drain system comprises four identical steam generators 1 enclosed into the protection tight volume (the remaining three steam generators are not shown in the scheme) with horizontal casing with lower casing component, cold 2 and hot 3 headers of the primary circuit with the pockets 36 and salt compartment 4 created between the headers and bottom surface of the steam generator, each steam generator is connected to the steam header 5, feed water supply pipeline 6, 7, 8 and 9, respectively, of the first, second, third and fourth steam generators, blowdown lines from the salt compartment 10, lower casing component 11 and pockets 36 of the headers 2 and 3 of the primary circuit 12. All blowdown lines of each steam generator are combined into a single blowdown header of the steam generator 13, 14, 15 and 16, respectively, with their further combination into the common blowdown header 17 of the steam generators 1. The common blowdown header 17 is connected to the regenerative heat exchanger inlet 18, with the discharge line 19 connected to the blowdown aftercooler and drain cooling line 20. The discharge line of the blowdown aftercooled water 21 of the blowdown aftercooler and drain cooling line 20 is taken out of the protective tight volume 22 and connected to the active water treatment system 23. The treated blowdown water discharge pipeline of the steam generators 24 of the active water treatment system 23 is provided with the treated blowdown water pumps 25—operating, reserve and repair, which pressure line 26 is taken out of the protective tight volume 22 and connected to the regenerative heat exchanger 18 intertubular space inlet, with the outlet connected to the feed water supply pipelines 6, 7, 8, and 9 of the relevant steam generator via the common pipeline for the treated blowdown water supply 27 and pipelines for treated blowdown water supply 28, 29, 30 and 31 of each steam generator, wherein the blowdown aftercooled water pipeline, after taken out of the protective tight volume, is provided with the steam generator drain and discharge pipeline connected to the water drain tank. The discharge line of the blowdown aftercooled water 21, after taken out of the protective tight volume 22, is provided with the drain and discharge pipeline of all four steam generators 32 that is connected to the water drain tank 33 provided with the pump 34 for discharge into the water discharge pipeline of the steam generators 35.

DETAILED DESCRIPTION OF THE INVENTION

The steam generating unit works as follows. The coolant from the primary circuit enters the "hot" header 3 of each steam generator 1, releases its heat to the steam generator 1 water and, cooled down, enters, through the "cold" header 2, the suction line of the main circulating pump (not shown in the scheme). The feed water is supplied to each steam generator 1 via the feed water supply pipelines 6, 7, 8 and 9 to the first, second, third and fourth steam generators 1, respectively. The dried steam is taken out of the steam header 5 of each steam generator 1, and then it is supplied to the turbine through the steampipes (not shown in the scheme).

The blowdown consists in continuous and regular extraction of some portion of the boiler water from the points where the corrosion products, salts and sludge are most probably accumulated. Via the blowdown pipelines 10, the flows of continuous and regular blowdowns are removed from the salt compartments 4 of each of the steam generators 1, blowdown pipelines 11 from the lower part of generators and pipelines 12 from the pockets 36 of the headers 2 and 3, then the flows of both continuous and regular blowdowns are combined in single blowdown headers 13, 14, 15 and 16 of the steam generators 1, and then in the common header 17 of the steam generators 1. The main consumption of the continuous blowdown is arranged via the blowdown pipelines 10 from the salt compartment 4 placed on the "cold" bottom of the casing. The regular blowdown of the steam generators is performed both from the salt compartment 4 and via the blowdown pipelines 11 of the lower part of generators and pipelines 12 from the pockets 36 of the headers 2 and 3. In the normal operation, the regular blowdown of the steam generators is performed in a cyclic way by increasing the consumption of one of four steam generators any time. Via the common header 17 the blowdown flows enter the regenerative heat exchanger 18 pipes where they are cooled down and wherefrom they are supplied via the regenerative heat exchanger 18 discharge pipeline 19 for aftercooling in the blowdown aftercooler and drain cooling line 20, and then flowing via the discharge line of the blowdown aftercooled water 21 they enter the active water treatment system 23 where the blowdown water of the steam generators are treated from the corrosion products and impurities in ion form, wherein the chemical condition of the secondary circuit is maintained for corrosion products and dissolved impurities. The treated blowdown water pump 25 mounted on the treated blowdown water discharge pipeline 24 of steam generators 1 supplies, via the pressure line 26, the cooled and treated from undesired impurities blowdown water to the regenerative heat exchanger 18 intertubular space where it is heated due to the blowdown water cooling that enters the regenerative heat exchanger 18 pipes via the common blowdown header 17 of the steam generators 1. The treated water, via the treated blowdown water main pipeline 27 and treated blowdown water pipelines 28, 29, 30 and 31 of each steam generator 1, respectively, is supplied as additional water to the feed water supply pipelines 6, 7, 8 and 9 of the relevant steam generator, and then via the feed water supply pipelines 6, 7, 8 and 9 to the first, second, third and fourth steam generators 1, respectively.

The draining is conducted as follows: when the steam generator 1 is shut down, the working medium of the steam generator 1 is removed via the blowdown pipelines 11 from the lower part of the generator and pipelines 12, from the pockets 36 of the headers 2 and 3, via the single blowdown header 13 and common blowdown header 17 of the steam generators, with the route through the regenerative heat exchanger 18 and discharge pipeline 19 of the regenerative heat exchanger 18 it is supplied to the blowdown aftercooler and drain cooling line 20 to cool down, and then via the discharge line of the blowdown aftercooled water 21 the medium is supplied to the drain and discharge pipeline 32 of all four steam generators, and then to the water drain tank from the steam generators 33, wherefrom it is pumped by the automatic pump 34 via the water discharge pipeline of the steam generators 35, and directed for treatment or further disposal.

The blowdown water pump 25 of steam generators is intended for the treated blowdown water return after active water treatment 23 to the steam generators 1 via the system of the feed water supply pipelines 6, 7, 8 and 9, the reserve and repair pumps can be also provided.

The regenerative heat exchanger 18 is intended for initial cooling of the blowdown water supplied for active water treatment 23 and further heating of the treated blowdown water after active water treatment 23 in various operation modes of the power unit—during start-up, power operation and cooling down.

The blowdown aftercooler and drain cooling line 20 is intended for aftercooling of the steam generator blowdown water supplied for active water treatment 23 during the power unit operation, cooling down and start-up. When the power unit is shut down, the blowdown aftercooler and drain cooling line 20 is intended for cooling the media drained from the steam generators.

INDUSTRIAL APPLICABILITY

In the claimed technical solution, the blowdown and drain system of the steam generating unit is implemented in the close loop, makes it possible to use the blowdown water as additional for the feed water of the steam generators, by preserving the blowdown water high pressure over the entire blowdown water treatment cycle, thus reducing the energy losses for the blowdown water return to the secondary circuit. Due to the increase blowdown consumption of the steam generators up to 140 t/h, the CC normalization time is reduced, and the improved WC of the secondary circuit provides for prolonging the service life of the steam generators, and respectively, the steam generating unit as a whole, and the reduced number of process lines laid through the containment improves its tightness, and no process communication with the engine hall makes the steam generating unit self-sustained.

The invention claimed is:

1. A steam generating unit of dual circuit reactor with blowdown and drain system, comprising:
   four identical horizontally arranged steam generators enclosed into a protection tight volume,
   each steam generator having hot and cold headers of a primary circuit with pockets and salt compartment;
   each steam generator being connected to a steam header, feed water supply pipeline, and blowdown lines;
   each steam generator being connected to the blowdown lines from the salt compartment, from a lower part of the steam generator and from said pockets of the primary circuit headers;
   wherein all the blowdown lines of each steam generator are combined into a single blowdown header of a steam generator with further combination into a common blowdown header of the steam generators that is connected to an inlet of a regenerative heat exchanger;
   wherein a discharge line of the regenerative heat exchanger is connected to a blowdown aftercooler; and
   a discharge line of the blowdown aftercooler is taken out of the protection tight volume and connected to an active water treatment system; and the active water treatment system being equipped with a discharge line of a treated blowdown water of the steam generators connected with at least, one treated blowdown water pump which is further equipped with a pressure line being brought into the protection tight volume and connected to an inlet of an intertubular space of the regenerative heat exchanger;

wherein an outlet of the intertubular space of the regenerative heat exchanger is connected to the feed water supply pipelines of the steam generators via a common pipeline for the treated blowdown water supply and pipelines for treated blowdown water supply of each steam generator.

2. The unit according to claim 1, wherein the discharge line of the blowdown aftercooler outside the protection tight volume, is provided with a steam generator drain and discharge pipeline connected to a water drain tank.

3. The unit according to claim 1, wherein the discharge line of the treated blowdown water of the steam generators is provided with three pumps—an operating pump, a standby pump and a repair pump.

\* \* \* \* \*